United States Patent Office.

HAYDN M. BAKER, OF ROCHESTER, NEW YORK, ASSIGNOR TO HIMSELF AND H. M. FRENCH, OF SPRINGFIELD, MASSACHUSETTS.

*Letters Patent No. 73,689, dated January 28, 1868.*

---

IMPROVEMENT IN THE MANUFACTURE OF SODA AND SULPHURIC ACID.

---

*The Schedule referred to in these Letters Patent and making part of the same.*

---

TO ALL WHOM IT MAY CONCERN:

Be it known that I, HAYDN M. BAKER, of Rochester, in the county of Monroe, and State of New York, have invented a new and useful Process for the Manufacture of Soda and Sulphuric Acid from salt-cake, (a mixture of sulphate and bisulphate of soda,) and that the following is a full and exact description thereof.

The nature of my invention consists in the decomposition of salt-cake with silicic acid and charcoal at elevated temperatures in close vessels, forming silicate of soda and liberating sulphurous acid; it also consists in the decomposition of the resulting silicate of soda in solution with water, by the use of caustic lime at the boiling-temperature of such solution.

To enable others skilled in chemic art to make use of my invention, I will proceed to describe it more particularly.

I take any quantity of salt-cake, and dissolve same in the least quantity of water necessary to effect a solution. I next evaporate to dryness again, keeping the mass constantly agitated, so that the dry mass may be in a pulverulent condition. I now mix the resulting dry mass with enough charcoal to insure the complete decomposition of the sulphuric acid contained in it; also with sufficient silicic acid to form a protosilicate of soda. This mixture is now charged into a clay retort, made of clay or fire-brick, while same is at a very elevated temperature, the said temperature being continuous, by the constant application of heat before, during, and after each batch. This retort is provided with a suitable conducting-pipe, to convey away the sulphurous acid to the lead-chambers, as fast as same shall be disengaged, at which place the said sulphurous acid vapors are reconverted into sulphuric acid, in the manner already known and practised by manufacturers of that article. After the reactions are complete, silicate of soda remains in the retort, and may be withdrawn into water, in which it dissolves, forming a solution of silicate of soda. I now slake sufficient quicklime to form a silicate of lime with the silicic acid used in the formation of silicate of soda. The lime is now added to the solution of silicate of soda, in the form of cream of lime, great caution being exercised, by adding same very slowly, and keeping up constant and brisk agitation. Silicate of lime is precipitated, and caustic soda remains in solution. This solution may be evaporated, and the dry mass will be what is known in commerce as caustic soda. Any other soda-salt may be made from this. The recovered sulphuric acid may be used to decompose new quantities of chloride of sodium, for the production of sulphate of soda again, at the same time giving muriatic acid, which may be used to decompose the silicate of lime formed in decomposing the silicate of soda. We shall then recover our silicic acid, and have a commercial product known as chloride of calcium left as a collateral product.

The advantages of this invention are, that it prevents the enormous waste of sulphuric acid now occasioned in the manufacture of soda-ash from salt-cake, thereby enabling the manufacturer to produce his products at very moderate rates.

*Claims.*

What I claim as my invention, and desire to secure by Letters Patent, is—

1. The recovery of sulphuric acid from salt-cake, by the use of silicic acid, with or without charcoal, in the manner herein described, or any other process substantially the same.

2. The decomposition of the silicate of soda with quicklime, in the manner herein described, or any other manner, substantially the same, and which produces the same intended results.

HAYDN M. BAKER.

Witnesses:
C. A. WINCHESTER,
W. S. MILLER.